United States Patent [19]
Gentile et al.

[11] Patent Number: 5,755,370
[45] Date of Patent: May 26, 1998

[54] PRESS FEED WITH INFINITELY VARIABLE STOCK MATERIAL ENGAGEMENT SPACING

[75] Inventors: Joseph P. Gentile; Vaughn H. Martin, both of Pittsburgh, Pa.

[73] Assignee: VAMCO Machine & Tool, Inc., Pittsburgh, Pa.

[21] Appl. No.: 707,363

[22] Filed: Sep. 4, 1996

Related U.S. Application Data

[63] Continuation of Ser. No. 202,513, Feb. 28, 1994, abandoned.

[51] Int. Cl.⁶ .................................................. B65H 20/00
[52] U.S. Cl. ........................... 226/154; 226/191; 226/189; 100/168
[58] Field of Search ........................ 226/154, 155, 226/186, 150, 140, 149, 162, 191, 187, 189; 100/168, 170, 216

[56] References Cited

U.S. PATENT DOCUMENTS

| | | | |
|---|---|---|---|
| 181,632 | 8/1876 | Brock | 100/218 |
| 3,707,255 | 12/1972 | Ridgway et al. | 226/136 |
| 3,758,011 | 9/1973 | Portmann | 226/142 |
| 3,782,618 | 1/1974 | Voorhees | 226/155 |
| 3,784,075 | 1/1974 | Portmann | 226/143 |
| 4,030,961 | 6/1977 | Straeten et al. | 100/170 X |
| 4,034,797 | 7/1977 | Yu | 226/189 X |
| 4,058,154 | 11/1977 | Streubel et al. | 226/187 X |
| 4,078,416 | 3/1978 | Voorhees et al. | 72/417 |
| 4,127,066 | 11/1978 | Sharkey | 100/168 |
| 4,133,216 | 1/1979 | Gentile et al. | 74/384 |
| 4,134,334 | 1/1979 | Johnson | 100/216 X |
| 4,138,913 | 2/1979 | Gentile et al. | 83/236 |
| 4,316,569 | 2/1982 | Gentile | 226/158 |
| 4,776,505 | 10/1988 | Kato | 226/152 |
| 4,788,908 | 12/1988 | Sugiyama et al. | 100/47 |
| 4,793,250 | 12/1988 | Niskanen | 100/170 X |
| 4,848,636 | 7/1989 | Kato | 226/152 |
| 4,869,411 | 9/1989 | Kato | 226/142 |
| 4,923,139 | 5/1990 | Bulso, Jr. et al. | 242/78.6 |
| 5,033,342 | 7/1991 | Nordlof | 83/73 |
| 5,145,169 | 9/1992 | Kato | 271/272 |
| 5,150,022 | 9/1992 | Waddington | 318/563 |
| 5,181,642 | 1/1993 | Gentile et al. | 226/137 |
| 5,197,645 | 3/1993 | Nordlof | 226/154 |

FOREIGN PATENT DOCUMENTS

| 1221648 | 6/1960 | France | 226/187 |
|---|---|---|---|

*Primary Examiner*—Daniel P. Stodola
*Assistant Examiner*—Emmanuel M. Marcelo
*Attorney, Agent, or Firm*—Reed Smith Shaw & McClay

[57] ABSTRACT

A press feed capable of being driven in synchronization with a press. The press feed includes a sensor for sensing a selected phase of a press cycle of the press, structure for engaging stock material adapted to be fed by the press feed to the press, and an infinitely variable release device connected to the stock material engaging structure and communicating with the sensor. The infinitely variable release device operates to move the stock material engaging structure in a first direction relative to the stock material responsive to detection by the sensor at the onset of the selected press cycle phase, and to move the stock material engaging structure in a direction generally opposite the first direction responsive to detection by the sensor at the termination of the selected press cycle phase. The infinitely variable release device may be a servo controlled drive screw.

15 Claims, 9 Drawing Sheets

PRESS FEED WITH INFINITELY VARIABLE STOCK MATERIAL ENGAGEMENT SPACING

This application is a continuation of application Ser. No. 08/202,513, filed on Feb. 28, 1994, now abandoned.

FIELD OF THE INVENTION

The present invention relates generally to press feeds for feeding stock material to a stamping press and more particularly press feeds for generating intermittent feeding of the stock material by rotational movement of one or more feed rolls or grippers.

BACKGROUND OF THE INVENTION

In metal stamping, parts are cold formed in high speed presses (e.g., 300–2000 spm) between mating portions of dies. Typically, the parts are formed in the dies progressively by advancing from station to station in the dies. This requires the parts to be registered to ten-thousandths of an inch or even a few millionths of an inch as they advance through the stations of the dies in the presses. This registration is generally done by pilots in the dies.

It is the conventional practice in high speed automatic press operations to feed a strip of stock material from a coil to the die of a press for stamping and the like, at a preselected length of the stock material. The stock material is fed from the coil in timed relation with the press operation by a press feed. The press feed measures the length of stock material fed to the press with each stroke of the press in a precise increment generally of about a thousandth of an inch, and clamps the material at all times during the stamping operation except for momentary positioning of pilots in the dies. During the positioning of pilots, the material must be registered and held only by the pilots for proper registration. The problem is that the point in the press cycle where such piloting occurs usually has to be changed with each die change, and requires time in setup for the part run to insure proper registration of the pilots and in turn the stock material from station to station in the die. Further, there is no way to change registration of the pilots during operation of the press and press feeds.

U.S. Pat. Nos. 4,133,216 and 4,138,913 disclose one type of press feed where the feed length is changed by changing gears in the drive train between a cam drive and the feed rolls. Such a geared cam feed is driven through an input shaft in synchronization with the press, and converts continuous rotation of the input shaft to a noncontinuous stepwise, intermittent rotational movement driving the feed rolls. The feed rolls advance intermittently in segments through a rotational cycle preferably with dwell periods between advances. During dwell periods, the feed rolls are not rotated and the stamping operation is performed in the dies in the press. The feed rolls clamp the stock material and are incrementally advanced to advance the stock material in preselected lengths during each intermittent advance by the press. Piloting is normally accomplished by a separate release cam driven by the input shaft to the cam drive of the feed that momentarily releases the feed rolls during each cycle of the press. Adjustment of the piloting position in relation to the press cycle is accomplished manually by rotationally positioning of the release cam relative to the input shaft.

U.S. Pat. Nos. 3,758,011 and 3,784,075 describe another type of press feed where the feed length is changed by a pivoted lever mechanism positioned in the drive train between a cardan drive and the feed rolls. The cardan drive is driven through an input shaft in synchronization with a press, and converts the continuous rotation of the input shaft into oscillating movement of a lever. One end of the lever is driven by the oscillating movement by the cardan drive and the other end of the lever is coupled to and drives the feed rolls. The feed length can be changed by moving the pivot of the lever along the length of the lever during each press cycle, when the feed rolls are released and returned, and a separate brake mechanism stops the stock material during roll return. Piloting is typically accomplished by a feed roll release driven by a cam positioned on the input shaft to the cardan drive. Adjustment of the piloting position in the press cycle is accomplished normally by rotationally positioning the cam relative to the input shaft.

U.S. Pat. No. 4,316,569 discloses another type of press feed where the feed length is changed by an adjustable cam drive. The cam drive is driven through an input shaft in synchronization with a press, and converts the continuous rotation movement of the input shaft into an intermittent, oscillating movement of an output shaft. A transfer arm is fixed to one end portion of the output shaft of the cam drive, and a link mechanism is connected between the transfer arm and the feed rolls. To change the feed length, the distance is changed between the output shaft from the cam drive and the connection of the link mechanism to the transfer arm, preferably by moving a slide member to which the link mechanism is connected along the transfer arm with a threaded adjusting means. The feed rolls clamp the stock material during forward advance of the feed length in the press and die, and a roll release releases the feed roll during the return in each press cycle and actuates a clamp mechanism to clamp the stock material during roll return. Both the roll release and the clamp mechanism are preferably driven by separate cams driven by the input shaft to the cam drive. Piloting is accomplished by relative positioning between the cams actuating roll release and material clamp, or by providing a third cam also driven by the input shaft to the cam drive that momentarily actuates the roll release. Adjustment of the piloting position in the press cycle can be again accomplished manually by rotationally positioning such third cam relative to the input shaft.

In order to assure proper adjustment of the momentary release cam relative to the press cycle, an operator had to first stop the press and press feed, loosen a lock mechanism which holds the pilot/release cam to the input shaft, and turn the pilot/release cam relative to the input shaft. The adjustment is variously described in U.S. Pat. No. 4,776,505, U.S. Pat. No. 4,848,636, and U.S. Pat. No. 4,869,411. This adjustment process is highly inefficient and time consuming during die setup and is not possible during press operation because: (1) it requires stoppage of the press and press feed in order to perform piloting adjustment, and (2) often times necessitates extensive trial and error involving repeated loosening of the lock mechanism, adjusting the position of the pilot release cam, and then retightening of the lock nut before the desired position of the momentary release for piloting can be attained.

Roll type stock feed apparatus have heretofore been made having a servomotor and a programmable servomotor controller for driving the feed rolls to advance stock material in selected increments. For example, U.S. Pat. Nos. 5,033,342 and 5,197,645 disclose a roll type stock feed apparatus having a servomotor drive for the feed rolls and a pneumatic system for applying and releasing feed pressure on the feed rolls during piloting. Means are provided for supplying pressurized air to the upper actuator chambers at a substantially constant first pressure sufficient to move the feed roll means downwardly into feeding relation with the stock material when the second actuator chamber is communicated to atmosphere, and the lower actuator chamber to apply and release feed pressure on the upper feed roll.

The servomotor for the feed rolls and a control valve of the pneumatic system are operated in timed relation with the press to actuate the feed roll into feeding engagement with the stock material before the servomotor is operated to advance a length of stock material, and to release pressure on the feed roll means before the pilot pins enter on the pilot holes in the stock material, and to thereafter reapply feed pressure to the feed rolls. The pneumatic system employed to effect the actual pilot release, i.e., regulator, accumulator actuator piston, piston rod, shiftable roll support yoke, control valve, and actuator chambers, suffers, however, from inherent limitations which detrimentally affect responsiveness, predictability/repeatability, the propensity for wear and tear and adjustability.

For instance, with a pneumatic roll release mechanism, time is needed to supply pressurized air to the upper and lower actuator chambers. Consequently, there is a lag between the time the signal is received from the press and the time the feed rolls are moved into feeding engagement with the stock material. Such lag time is a significant factor in limiting the maximum speed at which the press can be operated. Additionally, the actuator chambers or cylinders can become clogged resulting in fluctuations in air pressure which, in turn, leads to unpredictable performance. Furthermore, a pneumatic roll release mechanism or system is prone to wear and tear requiring increased maintenance and repair and replacement costs. Moreover, because a piston stroke generally is not adjustable in the absence of an adjustable stop means, the return travel of the pistons in a release direction is unnecessarily long. An increased stroke distance increases the response time required to thereafter move the feed roll back into feeding engagement with the stock material. Again, these response times are a significant factor in limiting the maximum speed at which the press can be operated.

U.S. Pat. No. 5,150,022 discloses a servo controlled pilot release mechanism for a press feed. The pilot release mechanism has a spring-loaded support for one of two pinch rollers between which stock material is fed. A cam follower attached to the support engages a cam which is driven by a servo motor. During operation of the press, a position sensor on the press outputs a signal indicative of the rotational position of the press crankshaft. The signal is input to a signal processor which includes a motor control circuit that drives the servo motor of the press feed. A position sensor on the servo motor also inputs a signal to the signal processor which compares the position of the press to the position of the servo motor and drives the servo motor to synchronize the motor with the press. The synchronization is such that as the press pilot pins engage the stock material in the press, and eccentricity of the cam engages the cam follower. The spring-loaded support is thereby pivoted against the biasing force of the spring such that the pinch rollers become momentarily separated. During this time the stock material is released and the pilot pins engage and align the stock material in preparation for a subsequent stamping operation.

Once piloting is complete and the eccentricity of the cam passes the cam follower, the spring urges the support into a position whereby the strip is clamped by the pinch rollers. While clamped, the stamping operation is executed and another increment of strip is fed into the press.

The apparatus thus described in U.S. Pat. No. 5,150,022 incorporates a system for synchronizing the piloting operation of the press feed with that of the press. Nevertheless, the elements employed to effect the actual pilot release, i.e., the spring-loaded pinch roll support, the cam follower and the servo motor driven cam, suffer from inherent limitations which detrimentally affect (1) the frequency of cam adjustment/replacement; (2) precision; (3) adjustability/programmability, and which can lead to damage of the stock material, particularly relatively soft stock material, during feeding thereof.

For instance, the geometry of a particular pilot release cam is invariable and is not suitable for all stock material runs. To illustrate, after a coil of stock material has been fed by the press feed and it is desired to run another strip of substantially greater or lesser gauge thickness therethrough, the operator must stop the press feed and the press and then manually replace the servo motor pilot release cam with one having an eccentricity configuration reflecting the desired pinch roller separation distance and release duration. Likewise, the biasing force of the spring-loaded pinch roller support may also have to be adjusted, if such is possible, or, alternatively, the spring or springs may have to be replaced to effect the desired pinch roller clamping force. Hence, for optimum results and versatility, the operator must maintain an inventory of pilot release cams and possibly biasing springs to adequately accommodate the various thicknesses and hardnesses of stock material that can reasonable be expected to be fed by the press feed. Quite obviously, however, the non-productive down-time required for cam replacement and/or biasing force adjustment increases overall machine operating costs, as does the procurement and maintenance of a sufficient inventory of pilot release cams and biasing springs.

Furthermore, the extent of the inventory of pilot release cams notwithstanding, there is a discrete difference, however small, in size and/or shape between any two cams. That is to say, one cannot achieve a true continuum of pinch roller spacing or pilot release duration regardless of the breadth of one's pilot release cam inventory. Hence, in many instances, the cam selected for a particular run will be the closest but not the best fit for the purposes of the run, whereby precision is unavoidably compromised.

Also, the physical dynamics of a cam eccentricity displacing a spring-loaded cam follower at high speeds commonly results in the cam follower becoming instantaneously separated from the cam surface as the apex of the cam eccentricity passes the cam follower. This momentary separation or "skip" causes the stored energy in the pinch roller support spring and the dead weight of the pinch roller to be brought suddenly down upon the surface of the stock material. In the event the stock material is relatively soft, this repeated pounding by the pinch rollers results in periodic indentation damage to the stock material. If severe enough, this damage can render the stock material useless for processing, thereby increasing resource material and, ultimately, final product costs.

A need exists, therefore, for a press feed capable of permitting precise and non-destructive handling of stock material to occur during die set-up and during operation of the press during the run. More particularly, a need exists for a press feed including a low-maintenance, high-precision stock material release mechanism that operates in virtual synchronization with at least one phase of a press cycle and which enables, inter alia, substantially infinitely variable material engagement means spacing during both operation and stoppage of the press feed, and gentle handling of the stock material during feeding thereof.

SUMMARY OF THE INVENTION

The present invention provides a press feed capable of operating in synchronization with a press. As is known to those skilled in the art, the servomotor of the press feed, the output shaft of which is coupled directly to the feed roll drive means through a gear, belt, chain or the like, imparts intermittent rotation to the feed means so as to impart intermittent, linear motion, with dwells between each intermittent rotation of the feed means, to the stock material being fed by the press feed when the feed means are in contact with the stock material. When engaged, the feed means, preferably feed rolls or grippers, intermittently advance stock material to a press in preselected feed lengths. During the dwell periods, the feed means are released from the stock material by at least one stock material release mechanism during piloting, all as more fully discussed hereinbelow. The press feed of the present invention and, in particular, the stock material release mechanism is not limited in its applicability to servo driven feed rolls, but can employ any roll or gripper feed such as where the feed means are supplied with power from the press by means of an appropriate power transmission means such as a gear, belt or chain coupled directly to the press crankshaft.

Unlike press feeds heretofore known in the art, the press feed proposed by the instant invention uses no cam or cam-driven mechanism to release the stock material from the feed means, clamping means or similar stock material engagement means. Importantly, by eliminating cams as means for releasing the stock material engagement means, the detrimental consequences of cam operation discussed above (e.g., necessity for frequent cam adjustment/ replacement, limited precision, and stock material impact damage) are effectively avoided.

Moreover, unlike press feeds heretofore known in the art, the press feed proposed by the instant invention uses no pneumatic actuator cylinder for releasing the feed rolls during piloting as is commonly used in conjunction with servo driven feed rolls. By eliminating pneumatic actuator cylinders as means for releasing the stock material engagement means, the detrimental effects of pneumatics discussed above (e.g., unresponsiveness, unpredictability, and propensity for wear and tear) are effectively avoided.

The invention offers a novel press feed including at least one stock material release mechanism that operates in synchronization with at least one press cycle phase. The release mechanism permits substantially infinitely variable material engagement means spacing capability during both operation and stoppage of the press feed, as well as gentle handling of the stock material during feeding thereof. The stock material release mechanism comprises means for separating the stock material engagement means from engagement with the stock material upon detection of the onset of at least one selected phase of a press cycle and for urging the stock material engagement means into gentle reengagement with the stock material upon detection of the termination of the selected press cycle phase. According to a presently preferred embodiment, the at least one press cycle phase includes the piloting phase and the separation of the stock material engagement means from engagement with the stock material. Thus, the feed means are released and gently reengaged with the stock material between incremental advancements of the stock material, i.e., during piloting. In the event the press feed is of the oscillating type, the at least one press cycle may also include the press dwell period during which the feed means are returned to their ready position and the stock material engagement means may also include means for clamping the stock material during the return of the feed means.

The stock material release mechanism further desirably comprises at least one or, preferably, two infinitely variable actuators which are operably connected to each of the feed means and/or clamping means. Actuator drive means, desirably in the form of one or more high speed reversible motors, operate the actuators to move the feed means and/or clamping means connected thereto either into or out of contact with the stock material. The actuator drive means operate pursuant to command signals generated by a suitable control means such as a microprocessor, CPU, or the like, which is in communication with sensor means that monitor certain conditions of the press, e.g., the angular rotational orientation of the press crankshaft, that reflect the onset of a selected press cycle phase. Conversely, the actuator drive means, under direction of the control means and sensor means, operate the actuators to transfer the feed means and/or clamping means in an opposite direction upon detection of the termination of the selected press cycle phase. In this way, the stock material engagement means act in synchronization with the selected phase(s) of the press cycle.

Pursuant to a presently preferred embodiment, for optimum speed and precision, the actuator drive means desirably comprise high speed, reversible electric motors and the infinitely variable actuators are screws drivenly connected to the motors. By inputting the appropriate stock material gauge and/or related data into the control means, the press feed of the instant invention may be precisely timed to engage and release the stock material in synchronization with one or more selected phases of a press cycle, yet gently but firmly grip the stock material when such is necessary. An advantage of using screws for these purposes is that with minor rotation, particularly if their thread pitch angle is comparatively large, the screws can be rapidly rotated in one direction and then in the opposite direction to bring the stock material engagement means into and out of operable contact with the stock material during selected press cycle phases.

In a second preferred embodiment, an actuator such as an air bag, air cylinder, hydraulic cylinder, or spring, most preferably an air bag, applies adjustable pressure downward on a pivot frame thereby gripping the stock material between the feed rolls. Rotation of actuator drive means in a first direction effects rotation of the screws thereby imparting a force upward to oppose the force generated by the actuator and causing idler feed roll to separate from the stock material and the driven feed roll. An advantage of utilizing an air bag in the present invention is that the actuator drive means need only to provide torque during the piloting or release phase of press operation thereby reducing heat generation. Additionally, utilization of an air bag reduces wear and tear on the screws; moreover, the internally threaded means threadedly engaged by the screws can be more easily adjusted, since backlash is not a problem in single direction applications.

The press feed of the present invention is a low-maintenance, high precision apparatus which allows for rapid and precise set up of the press feed with each die change. In addition, the instant press feed permits infinite variation (within the expected operational parameters of the press feed) of the stock material engagement means spacing and engagement/disengagement duration in respect to any selected phase of a press cycle, e.g., piloting. Moreover, the adjustments may be made while the press is stopped or operating.

Other details and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, in the accompanying drawings, wherein.

DETAILED DESCRIPTION OF THE INVENTION

Figure 1:
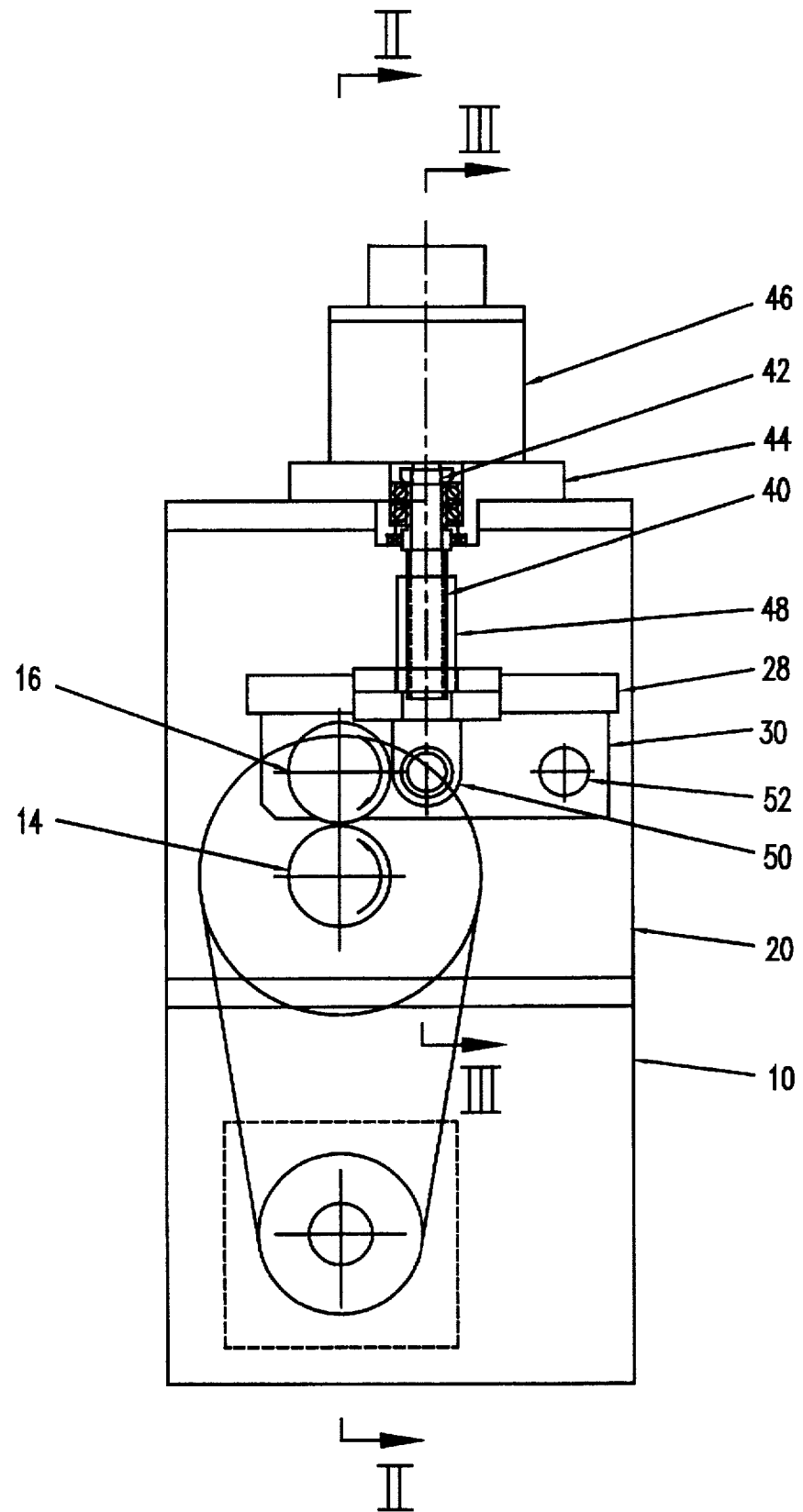
FIG. 1 is a side elevation view of a first preferred embodiment of a feed press constructed in accordance with the present invention.
Figure 2:
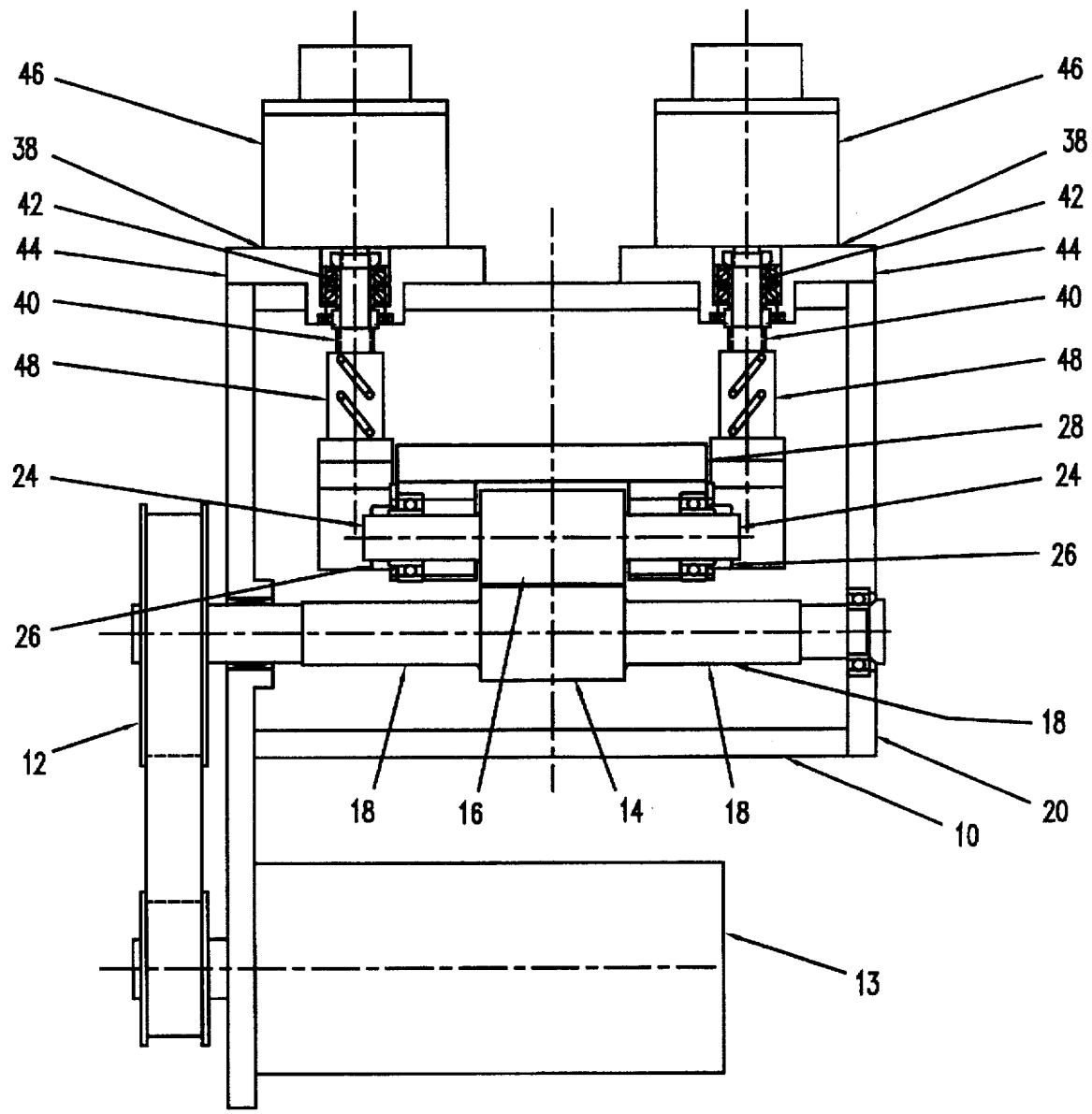
FIG. 2 is a view taken along line II—II of FIG. 1.
Figure 3:
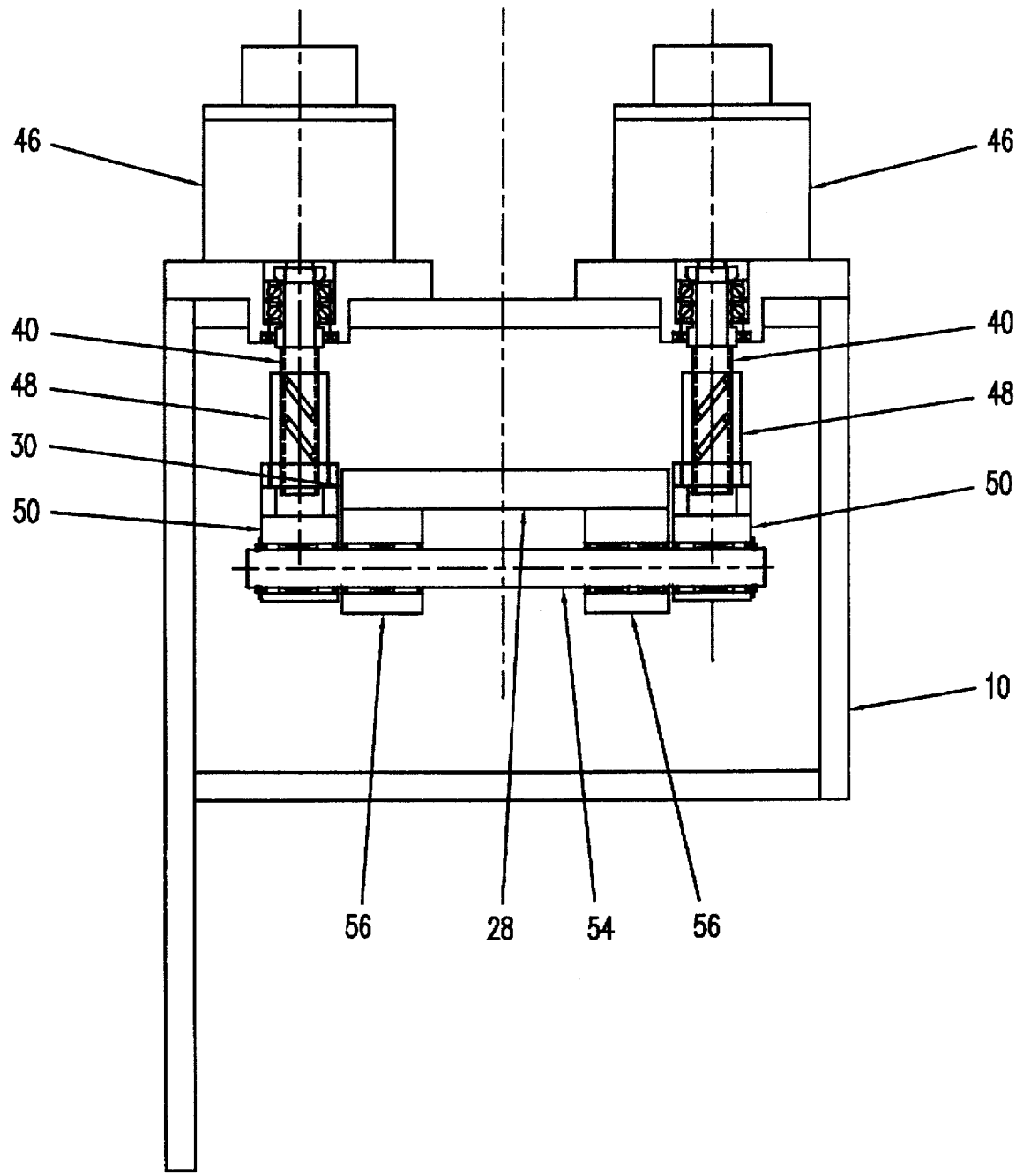
FIG. 3 is a view taken along line III—III of FIG. 1.

Referring first to FIGS. 1 through 3, there is depicted a presently preferred embodiment a press feed, identified herein by reference numeral 10, constructed according to the instant invention.

Press feed 10 delivers strip-like metal stock material (not illustrated) in incremental lengths to a press 11 (schematically shown in FIG. 7) whereat the stock material passes through one or more dies which perform stamping operations on the stock material. As is conventional, press feed 10 includes drive means 12, which may be a gear, pulley or sprocket, which is driven through appropriate power transmission means such as a gear, belt or chain coupled directly to the output shaft of servomotor 13. Although not illustrated, the output shaft servomotor 13 can be drivenly connected to first shaft 18 in order to drive feed roll 14.

The press feed 10 further comprises stock material engagement means, preferably in the form of feed rolls 14 and 16, which clamp and incrementally advance the stock material to the press in preselected incremental lengths. According to the preferred and illustrated mode of operation, feed rolls 14 and 16 advance the stock material linearly via noncontinuous and nonoscillating, stepwise, intermittent, rotational movement of the feed rolls which are driven by servomotor 13. It will be understood, however, that the press feed of the present invention need not be limited in its applicability to servo driven feed rolls, but can employ any roll or gripper feed such as where the feed means are supplied with power from the press by means of an appropriate power transmission means such as a gear, belt or chain coupled directly to the press crankshaft. The reader will therefore appreciate that the manner by which the feed rolls 14 and 16 are driven is not critical to the present invention and thus will not be discussed in depth except where necessary to provide a proper understanding of the invention. Likewise, in the situation where the press feed is constructed and functions as an oscillating type feed, there will be other stock material engagement means, namely clamping means, which engage the stock material during return of the feed rolls. In that case, the structure and function of the stock material release mechanism described hereinafter is equally adaptable to such other stock material engagement means.

Rolls 14 and 16 clamp and pull the stock material from a supply source such as a coil or the like while simultaneously advancing the material to the press. As depicted most clearly in FIG. 2, feed roll 14 is integrally connected to a first shaft 18 which is rotatably supported by suitable bearings in a press feed housing 20.

Feed roll 16 is integral with a second shaft 24. Second shaft 24 is supported for rotation in a pillow blocks 26 or similar bearing structure carried by the underside of plate 28 of a pivot frame 30 of the roll release mechanism of the present invention. Hence, the feed roll 16 is mounted so as to pivot with the pivot frame 30.

In a typical feeding operation, the feed roll 14 (the "driven" feed roll by virtue of its connection to drive means 12 through first shaft 18) is rotated in a counter-clockwise direction as shown in FIG. 1, whereas feed roll 16 (the "idler" roller by reason of its freely rotatable status) is rotated in a clockwise direction through its frictional and clamping contact with the upper surface of the stock material. Recall that drive means 12, albeit capable of operating in synchronization with a press, is driven by means independent from the press through appropriate power transmission means such as a gear, belt or chain coupled directly to the output shaft of servomotor 13. Further recall that the output shaft of servomotor 13 can be drivenly connected to first shaft 18 in order to drive feed roll 14.

The stock material release mechanism of the press feed of the present invention has an essential feature thereof means for separating the stock material engagement means, e.g. feed rolls 14, 16, clamping means, or the like, from engagement with the stock material upon detection of the onset of at least one selected phase of a press cycle, and for urging the stock material engagement means into gentle reengagement with the stock material upon detection of the termination of the selected press cycle phase. The only press cycle phase during which the feed rolls 14 and 16 of the press feed 10 are released from engagement from the stock material is the piloting phase. However, the stock material release mechanism disclosed herein is equally adaptable to stock material clamping means of the sort used in oscillating type press feeds to clamp the strip during the press cycle phase corresponding to that period of time when the oscillating feed rolls are returned to their ready position.

In any case, the stock material release mechanism which separates the stock material engagement means from engagement with the stock material and urges the stock material engagement means into gentle reengagement with the stock material preferably comprises a combination of interrelated components functioning in concert to effect the desired objectives of the present invention.

More specifically, the stock material release mechanism desirably includes at least one or, preferably, two infinitely variable actuators 38 ("infinitely variable" meaning infinitely adjustable within the expected working parameters of the press feed 10). Two rather than one actuators are preferable in order to balance the clamping force that the actuators apply to the feed roll 16. According to a presently preferred embodiment, these actuators consist of screws 40 integrally joined to first ends of actuator shafts 42 rotatably supported by suitable bearings in actuator housings 44 attached to the press feed housing 20. The opposite ends of the actuator shafts are drivenly connected to the output shafts of actuator drive means 46 which are high speed, reversible servomotors.

Referring to FIGS. 1 through 3, it will be seen that screws 40 threadedly engage internally threaded means 48 such as nuts or the like affixed atop pillow blocks 50 situated at opposite sides of the pivot frame 30. The pivot frame is supported for pivotable movement about pivot shaft 52. Journalled at its opposite ends in pillow blocks 50 is an elongated shaft 54 which also desirably passes through a pair of intermediate pillow blocks 56 attached to and depending from the lower surface of plate 28 of pivot frame 30.

As will by now be appreciated, rotation of actuator drive means 46 in a first direction effects rotation of the screws 40 to raise the shaft 54 such that pivot frame and the idler feed roll 16 supported thereby is caused to pivot upwardly about pivot shaft 52 and separate from the stock material and driven feed roll 14. Opposite rotation of actuator drive means 46 effects the opposite result. That is, the pivot frame and feed roll 16 pivot downwardly about pivot shaft 52 whereby the feed roll 16 is brought into contact with the stock material. With independent operation of the actuators 38, stock material of slightly non-rectangular cross-sectional configuration may be accommodated by the press feed and differential clamping force may be applied by the stock material engagement means when such is desired or necessary. It will be understood, however, that the press feed of the present invention and, in particular, the stock material release mechanism, including variable actuators 38, is not limited in its applicability to variable actuators which are integral with actuator drive means 46. Instead variable actuators 38 can be driven separately or together through appropriate power transmission means such as a gear, belt, or chain coupled directly to the output shaft of a separate, non-integral motor or motors. The advantage of using screws, however, is that with minor rotation, particularly if their thread pitch angle is relatively steep, the screws can be rapidly rotated in one direction and then in the opposite direction to bring the stock material engagement means into and out of operable contact with the stock material during selected press cycle phases, including very brief phases such as piloting.

Figure 4:
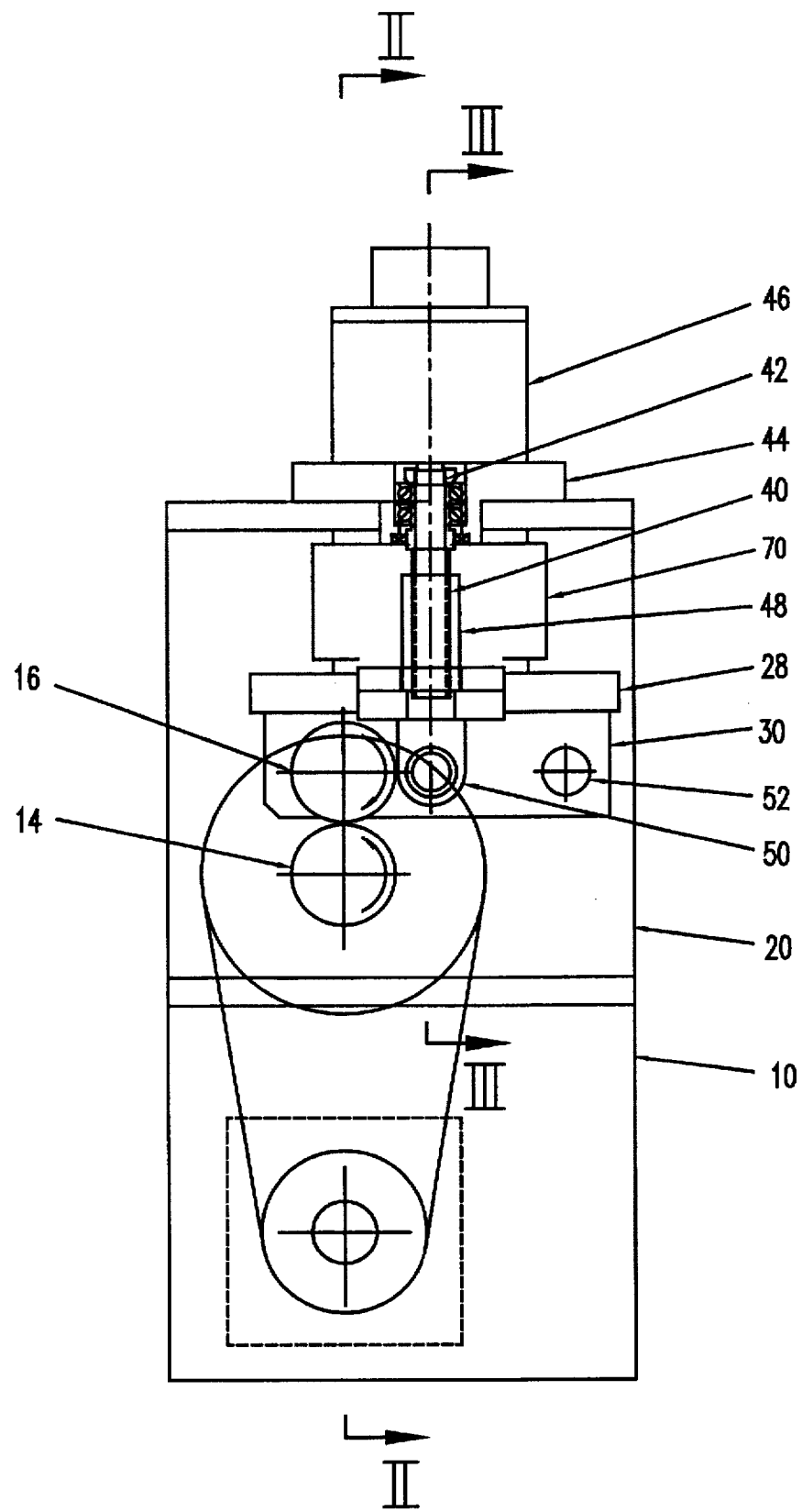
FIG. 4 is a view similar to FIG. 1 of a second preferred embodiment of a feed press according to the present invention.
Figure 5:
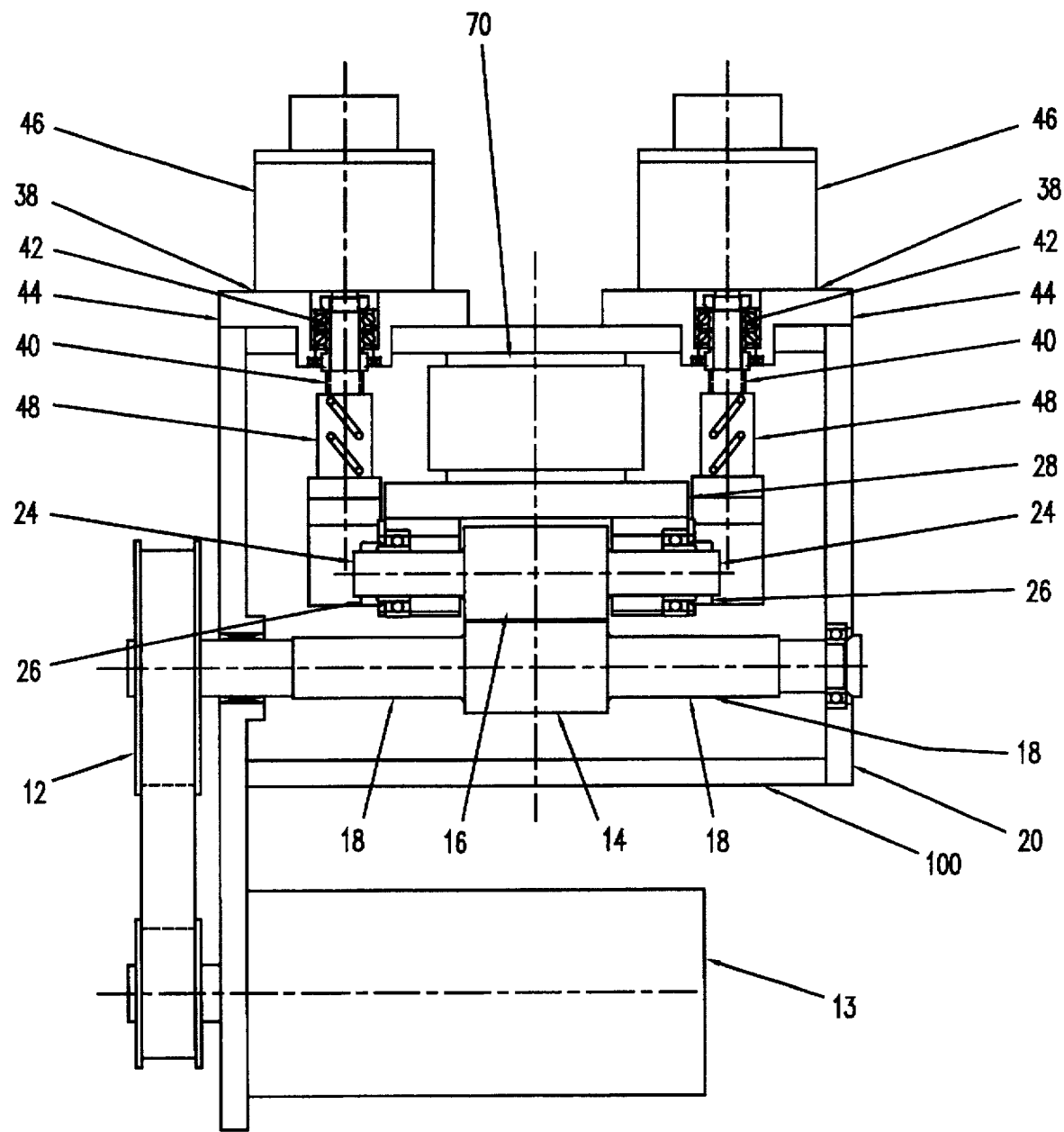
FIG. 5 is a view similar to FIG. 2 of a second preferred embodiment of a feed press according to the present invention.
Figure 6:
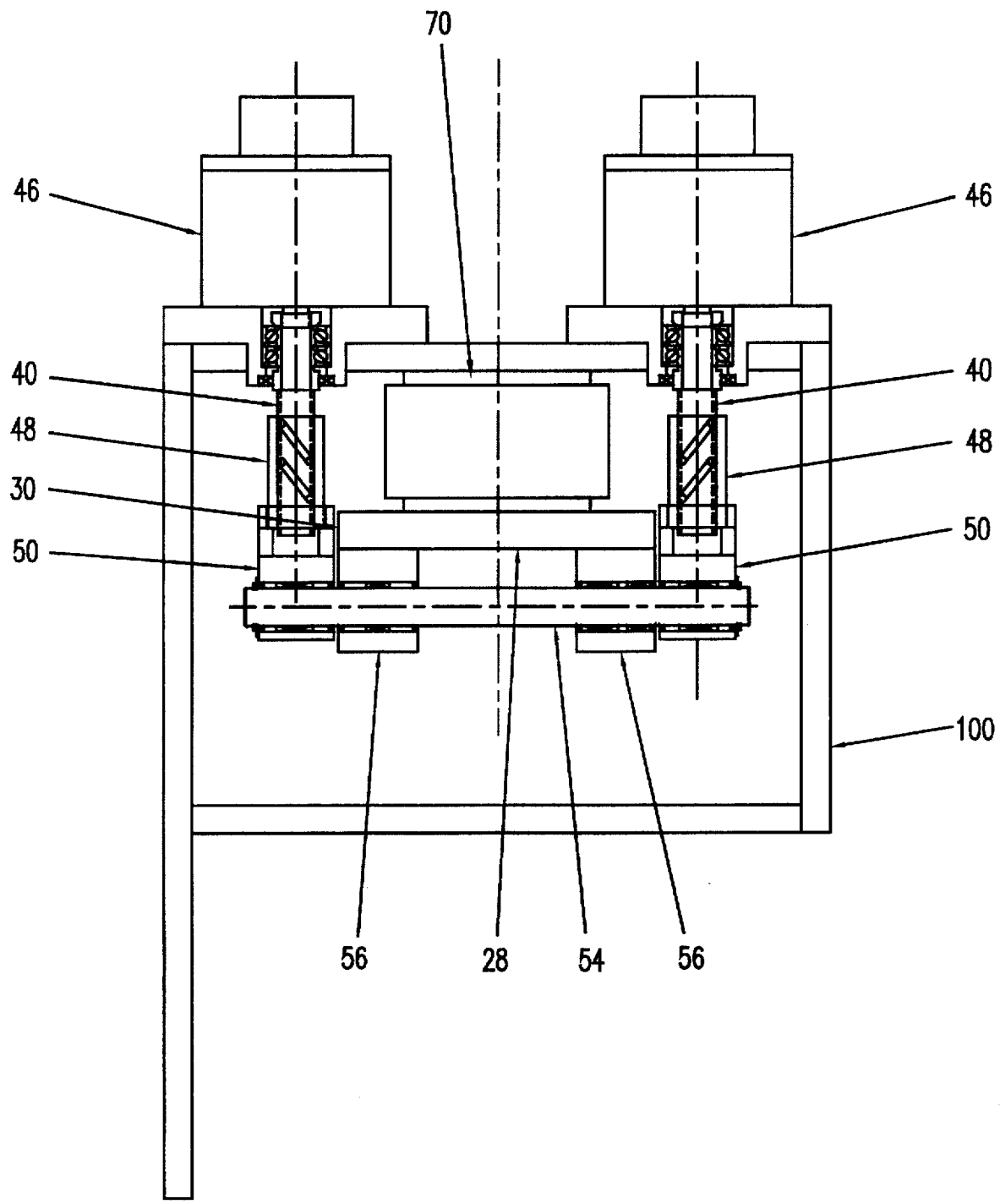
FIG. 6 is a view similar to FIG. 3 of a second preferred embodiment of a feed press according to the present invention.

FIGS. 4 through 7 represent a second preferred embodiment of a press feed constructed in accordance with the present invention, herein identified by reference numeral 100. In FIG. 4, like references indicate similar elements having similar functions to those discussed thus far in connection with FIGS. 1 through 3. And, only those elements or functions which materially depart from their counterparts in FIGS. 1 through 3 will be described in detail. The press feed 100 differs from press feed 10 in that actuator 70 has been added. Actuator 70 is an air bag, air cylinder, hydraulic cylinder, or spring, most preferably an air bag. Actuator 70 applies adjustable pressure downward on pivot frame 30 thereby causing the stock material to be gripped between feed rolls 16 and 14. Rotation of actuator drive means 46 in a first direction effects rotation of the screws 40 to raise the shaft 54 thereby imparting a force upward to oppose the force generated by actuator 70 and causing idler feed roll 16 to pivot upwardly about shaft 52 and separate from the stock material and driven feed roll 14.

Figure 7:
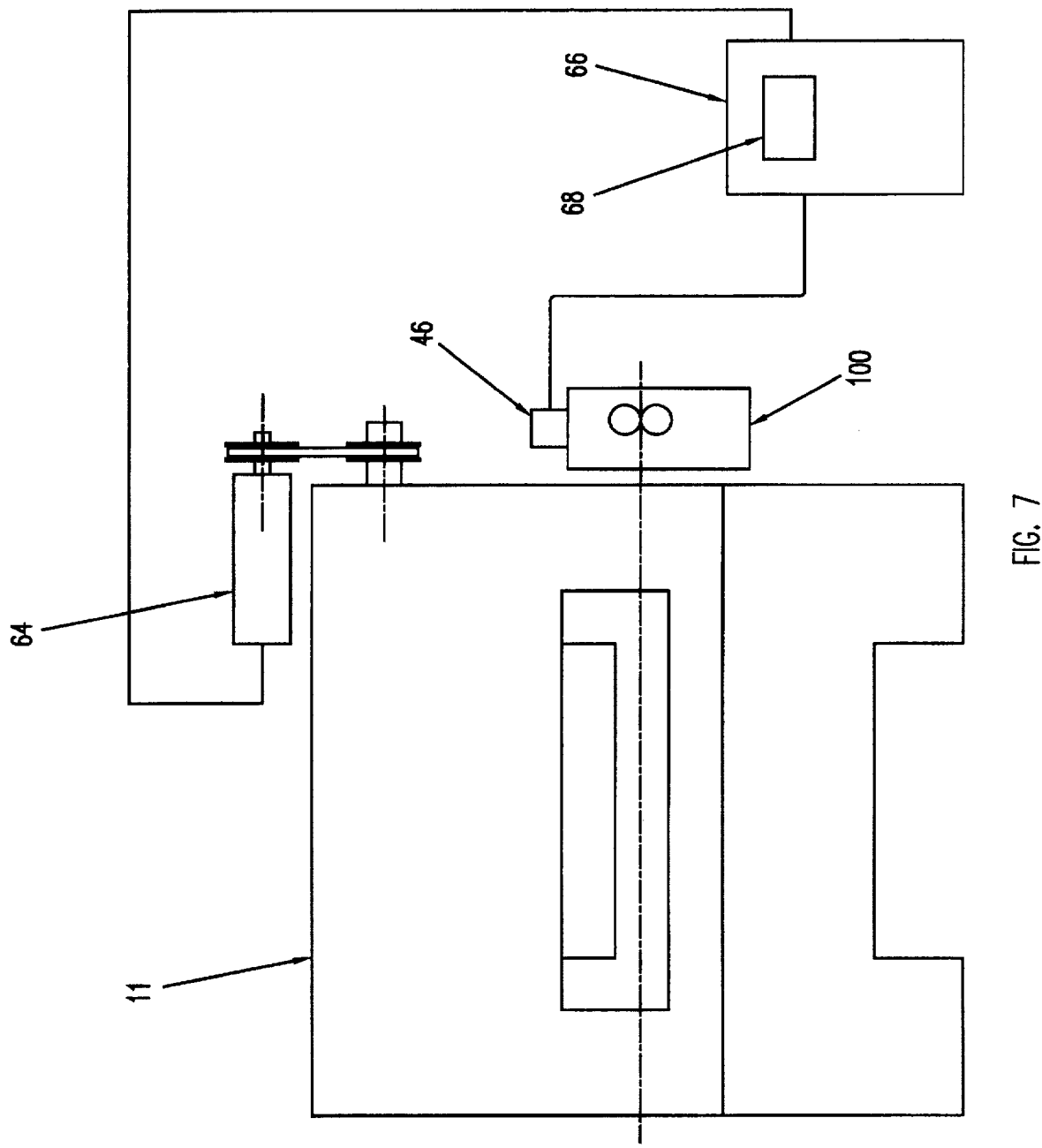
FIG. 7 is a schematic showing further aspects of the present invention.

As shown schematically in FIG. 7, sensor means 64 monitor certain conditions of the press 11, e.g., the angular orientation of the press crankshaft, that reflect the onset of a selected press cycle phase, such as, piloting. The sensor means 64 transmits a signal to a control means 66 such as a CPU, microprocessor, or the like, whereby angular orientation of the press cycle is constantly monitored by control means 66. Control means 66 generates a command signal associated with the onset of the selected press cycle phase and transmits that command signal to actuator drive means 46 which in turn adjusts the infinitely variable actuators 38 of press feed 100 a predetermined amount to move the stock material engagement means both toward and away from the stock material, in a predetermined sequence with the angular position of the press 11.

The stock material release mechanism also preferably includes data input means 68 such as a conventional computer keyboard. Through data input means 68, data such as, for example, stock material thickness, cross-sectional configuration, hardness and composition, and press feed control data including, but not limited to, nominal stock material engagement means spacing and desired compressive force to be applied by the stock material engagement means, may be input into control means 66. In other respects, the operation of press feed 100 is essentially the same as press feed 10. Although actuator drive means 46, sensor means 64, control means 66, and data input means 68 are depicted in connection with press feed 100, it should be noted that such elements can be utilized with press feed 10 described hereinabove, as well as press feeds 110 and 120 described hereinbelow.

Consequently, the operation of the press feed may be precisely tailored to the peculiarities of the stock material during die set up and adjustments may be made during press feed operation without having to stop the press feed. Thus, under all operating conditions the press feed of the present invention may function in synchronization with any desired phase of the press cycle while assuring precisely controlled and firm but gentle handling of the stock material throughout the run.

Figure 8:
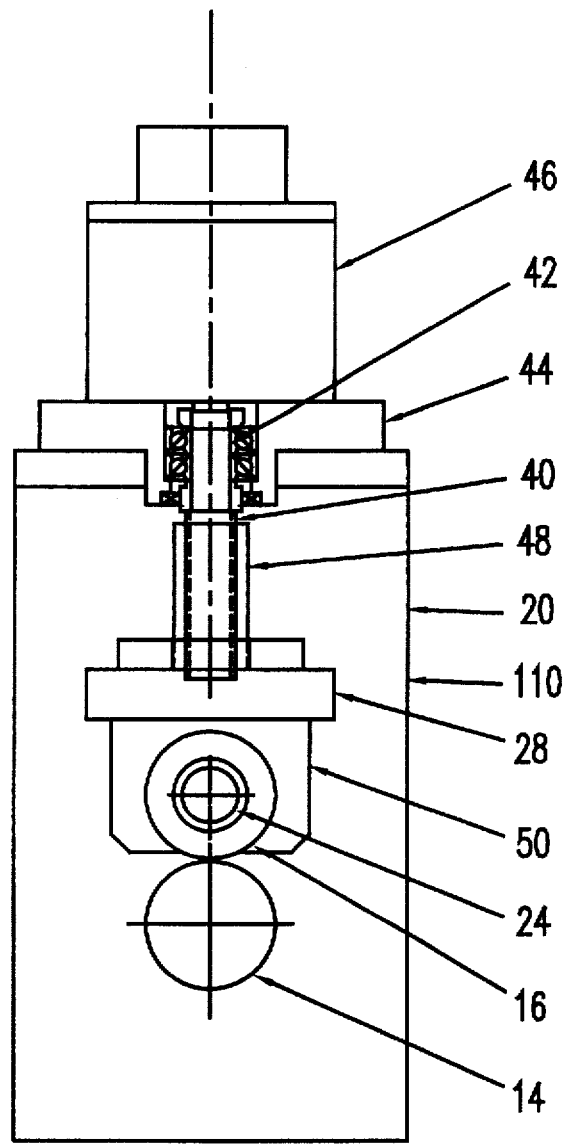
FIG. 8 is a view similar to FIG. 1 of a third preferred embodiment of a feed press according to the present invention.

FIG. 8 represents a third preferred embodiment of a press feed constructed in accordance with the present invention, herein identified by reference numeral 110. In FIG. 8, like references indicate similar elements having similar functions to those discussed thus far in connection with FIGS. 1 through 3. And, only those elements or functions which materially depart from their counterparts in FIGS. 1 through 3 will be described in detail. The press feed 110 differs from press feed 10 in that the pivot frame 30 and most of its associated hardware are eliminated. Thus, the idler feed roll 16 is journalled at its opposite ends in pillow blocks 50 depending from plate 28. Hence, the stock material release mechanism acts to linearly reciprocate rather than pivot the feed roll 16 toward or away from the stock material and feed roll 14 upon operation of the infinitely variable actuators 38. In other respects, the operation of press feed 110 is essentially the same as press feed 10.

Figure 9:
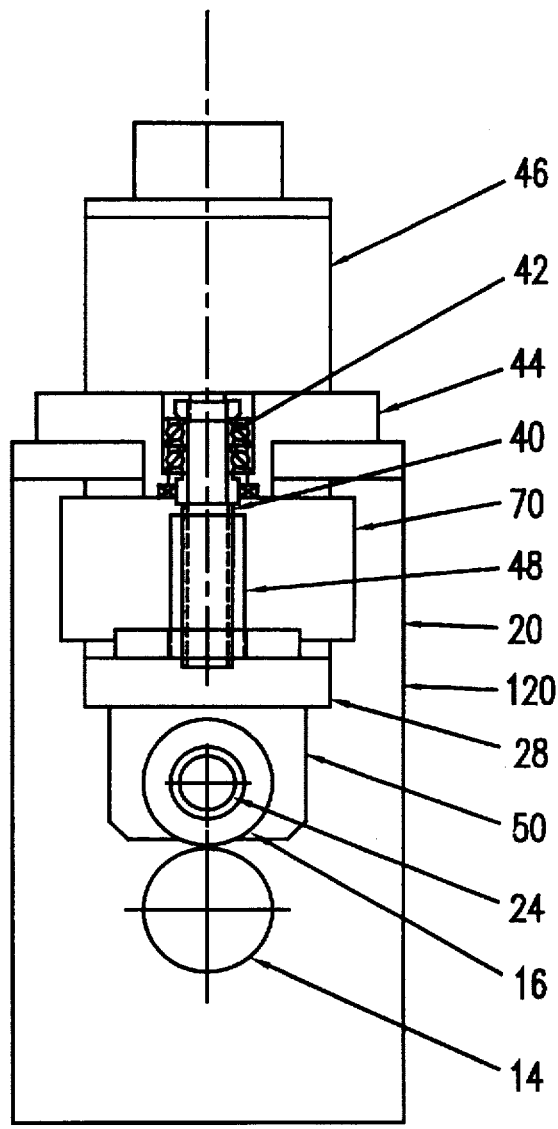
FIG. 9 is a view similar to FIG. 8 of a fourth preferred embodiment of a feed press according to the present invention.

FIG. 9 represents a fourth preferred embodiment of a press feed constructed in accordance with the present invention, herein identified by reference numeral 120. In FIG. 9, like references indicate similar elements having similar functions to those discussed thus far in connection with FIG. 8. And, only those elements or functions which materially depart from their counterparts in FIG. 8 will be described in detail. The press feed 120 differs from press feed 110 in that actuator 70 has been added. As discussed hereinabove with respect to FIGS. 4 through 6, actuator 70 is an air bag, air cylinder, hydraulic cylinder, or spring, most preferably an air bag. Actuator 70 applies adjustable pressure downward on plate 28 thereby causing the stock material to be gripped between feed rolls 16 and 14. Rotation of the actuator drive means 46 is a first direction effects rotation of the screws 40 so as to impart a force upward to oppose the force generated by actuator 70, thereby causing idler feed roll 16 to be linearly reciprocated rather than pivoted away from the stock material upon operation of the infinitely variable actuators 38. In other respects, the operation of press feed 120 is essentially the same as press feed 110.

Although the invention has been described in detail for the purpose of illustration, it is to be understood that such detail is solely for that purpose and that variations can be made therein by those skilled in the art without departing from he spirit and scope of the invention except as it may be limited by the claims.

What is claimed is:

1. A press feed capable of being driven in synchronization with a press, said press feed comprising:

means for sensing a selected press cycle phase of said press;

means for engaging stock material adapted to be fed by said press feed to said press; and release means infinitely variable during the feeding of said stock material to said press connected to said means for engaging stock material and communicating with said sensing means, said release means being operable to move said means for engaging stock material in a first direction relative to said stock material responsive to detection by said sensing means of the onset of said selected press cycle phase to cause separation of the means for engaging from said stock material and for moving said means for engaging stock material in a direction generally opposite said first direction responsive to detection by said sensing means of the termination of said selected press cycle phase to cause the means for engaging to reengage with said stock material.

2. The press feed of claim 1 wherein said selected press cycle phase is during piloting of said stock material in said press.

3. The press feed of claim 1 wherein said means for engaging stock material comprise means for feeding said stock material to said press.

4. The press feed of claim 1 wherein said release means comprises:

at least one rotatable screw; and means for rotating said at least one rotatable screw in opposite directions.

5. The press feed of claim 4 wherein said at least one rotatable screw comprises two rotatable screws.

6. The press feed of claim 1 further comprising adjustable pressure means connected to said means for engaging stock material, said adjustable pressure means beings operable to move said means for engaging stock material only in a direction generally opposite said first direction responsive to detection by said sensing means of the termination of said selected press cycle phase.

7. The press feed of claim 6 wherein said adjustable pressure means is an air bag.

8. The press feed of claim 6 wherein said selected press cycle phase is during piloting of said stock material in said press.

9. The press feed of claim 6 wherein said means for engaging stock material comprise means for feeding said stock material to said press.

10. The press feed of claim 6 wherein said infinitely variable release means comprise:

at least one rotatable screw; and power means for rotating said at least one rotatable screw in opposite directions.

11. The press feed of claim 10 wherein said at least one rotatable screw comprises two rotatable screws.

12. The press feed of claim 6 further comprising means for controlling the operation of said release means during at least one cycle of operation or stoppage of said press feed.

13. The press feed of claim 12 wherein said controlling means is operable to receive a first signal from said sensing means indicative of said onset of said selected press cycle phase and to generate and transmit a first command signal to power means drivenly connected to said release means to move said means for engaging stock material in said first direction, said controlling means being further operable to receive a second signal from said sensing means indicative of said termination of said selected press cycle phase and to generate and transmit a second command signal to said power means to move said means of engaging stock material in said second direction.

14. The press feed of claim 1 further comprising means for controlling the operation of said release means during at least one of operation or stoppage of said press feed.

15. The press feed of claim 14 wherein said controlling means is operable to receive a first signal from said sensing means indicative of said onset of said selected press cycle phase and to generate and transmit a first command signal to power means drivenly connected to said release means to move said means for engaging stock material in said first direction, said controlling means being further operable to receive a second signal from said sensing means indicative of said termination of said selected press cycle phase and to generate and transmit a second command signal to said power means to move said means of engaging stock material in said second direction.

* * * * *